United States Patent [19]

Levine et al.

[11] Patent Number: 5,236,468
[45] Date of Patent: Aug. 17, 1993

[54] METHOD OF PRODUCING FORMED CARBONACEOUS BODIES

[75] Inventor: Michael H. Levine, Farmington Hills, Mich., Curtin E. Schafer, Jr., deceased, late of Butler, Pa., by Vicki A. Schafer, Executrix.

[73] Assignee: J. S. McCormick Company, Pittsburgh, Pa.

[21] Appl. No.: 854,126

[22] Filed: Mar. 19, 1992

[51] Int. Cl.⁵ .......................... C10L 5/00; C10L 5/16
[52] U.S. Cl. ........................................ 44/564; 44/568
[58] Field of Search ................ 44/564, 568; 264/29.3, 264/29.1, 29.5, 29.7; 423/614

[56] References Cited

U.S. PATENT DOCUMENTS

| | | | |
|---|---|---|---|
| 1,714,165 | 5/1929 | Gilbert | 264/29.1 |
| 2,270,199 | 1/1942 | Thrune | 264/29.1 |
| 2,314,641 | 3/1943 | Wolf | 202/34 |
| 3,140,241 | 7/1964 | Work et al. | 44/568 |
| 3,236,921 | 2/1966 | Sermon | 264/29.1 |
| 3,316,183 | 4/1967 | King et al. | 252/510 |
| 3,812,240 | 5/1974 | Wittaker et al. | 423/449 |
| 3,838,988 | 10/1974 | Sanada et al. | 44/23 |
| 3,926,576 | 12/1975 | Schmalfeld et al. | 44/10 |
| 4,071,604 | 1/1978 | Schwemer | 423/445 |
| 4,272,324 | 6/1981 | Sunami et al. | 44/568 |
| 4,383,970 | 5/1983 | Komuro et al. | 428/614 |
| 4,412,841 | 11/1983 | DuBroff et al. | 44/10 |
| 4,519,807 | 5/1985 | Nishino et al. | 44/15 R |
| 4,847,021 | 7/1989 | Montgomery et al. | 264/29.6 |
| 4,908,167 | 3/1990 | Beckmann et al. | 264/29.3 |
| 4,929,404 | 5/1990 | Takahashi et al. | 264/29.1 |

Primary Examiner—Margaret Medley
Attorney, Agent, or Firm—Kirkpatrick & Lockhart

[57] ABSTRACT

A method for producing formed bodies from carbonaceous substances in which the starting materials are dry particles of synthetic graphite at least as fine as 20 mesh and dry particles of coal tar pitch at least as fine as 200 mesh. The synthetic graphite particles are intimately mixed with the coal tar pitch particles to form a mixture having about 4% to about 10% coal tar pitch and preferably about 6% to about 7% coal tar pitch. At least a portion of the mixture is then compressed under pressure sufficient to raise the temperature of the mixture to at least the softening point of the coal tar pitch. Pressure is maintained on the mixture for the period of time necessary to form a compact carbonaceous body having a volume at least equal to that of a sphere of ⅜ inch in diameter.

17 Claims, 2 Drawing Sheets

METHOD OF PRODUCING FORMED CARBONACEOUS BODIES

BACKGROUND OF THE INVENTION

1. Field of the Invention

This invention relates to a method for producing formed bodies. More particularly, the invention relates to a method for producing formed bodies from carbonaceous starting materials for raising the carbon content of metals.

2. Description of the Invention Background

The manufacture of metals may involve the deliberate addition of various chemical elements, or "addition elements," to the molten metal to alter the composition or properties of the metal in some desirable way. The desirable results achieved by using addition agents may include deoxidation of the molten metal to some desired degree, control of the grain size of the metal, improvement of the mechanical and physical properties and corrosion resistance of the finished metal, and increases in response of the metal to subsequent heat treatments.

One addition element, carbon, may be added to molten ferrous metals, for example steel or iron, to increase the carbon content of the metals and thereby increase the metals' hardness, tensile strength, and yield strength properties. In order to maximize the effect of the carbon-containing addition element and to avoid contamination of the molten metal with substances which may impart undesirable characteristics to the finished metal, it is desirable that the carbon-containing addition element, or "carbon raiser," be high in available carbon content and contain a minimum amount of non-carbon contaminants. Such undesirable contaminants may include, for example, sulphur, hydrogen, and nitrogen.

Known carbon raiser products have included coarse granules of graphite, particles of metallurgical coke or coal, petroleum derivatives or the same or similar carbonaceous substances processed in, for example, the form of briquets or pellets. While some of these carbon sources are inexpensive to use, they introduce impurities into the metal. Metallurgical coke, for example, contains excessive amounts of sulfur and nitrogen impurities. It is of paramount importance to minimize the impurities introduced into the metal.

Carbon raisers are emptied directly into the furnace during the production of the metal. To avoid problems the carbon raiser bodies must not be too large or too small. If the preformed carbon raiser bodies are too large, they may not dissolve quickly enough in the molten metal. The ratio of surface area to volume is too low. The undissolved carbon raiser product is drawn off in the slag and never gets into the metal. The extreme heat qenerated by the molten metal within the furnace causes heated gases to rise up the furnace flue, creating a strong updraft. If the preformed carbon raiser bodies have insufficient mass to oppose the upward gas current, they are driven up the flue and never reach the molten metal. In both situations, the result is lower than expected carbon content for the finished metal. More carbon raiser product is then necessary to achieve the desired carbon content in the metal. However, adding more of a carbon raiser product that contains impurities raises the impurities in the metal.

In order to form carbon raiser bodies of acceptable mass and size unitary bodies have been formed from agglomerations of the carbon raiser particles. It is, however, difficult to form such unitary bodies from the carbonaceous substances conventionally used as carbon raisers. Graphite is, for example, lubricous and very difficult to compress into briquettes or pellets. Coke fines have been shown to be difficult to briquette.

Known carbon raiser products utilize binders to bind particulate materials together into bodies having a sufficient mass and an acceptable ratio of surface area to mass. Examples include mineral-based substances such as sodium silicate, or carbohydrate-based substances such as dextrin, starch, or a molasses/sulfur mixture. For several reasons, carbon raiser bodies formed using these known binder substances have proven to be deficient.

An additional problem is the lack of physical integrity exhibited by the known carbon raiser products. Currently available preformed carbon raiser bodies employ highly volatile binders which burn out in the intense heat of the furnace. With the binder gone, the bodies fragment. Carbohydrate-based binders, for example, will burn out at between 390°–500° C. Many of the fragmented particles created when the binder burns out will have insufficient mass to reach the molten metal through the heated updraft. Also, carbon raiser products encounter physical stresses during both shipping and storage. Carbon raiser product is customarily made in the form of preformed units, such as briquets or pellets, and sold in bags or other containers which may include fifty or more pounds of product. The bags of carbon raiser bodies are often handled roughly and stored or shipped in stacks on pallets. The carbon raiser bodies in the bags are thus subjected to physical stress. The poor structural integrity of known carbon raiser products allows the individual briquets, pellets, or other preformed bodies to crack or crumble into smaller pieces, or to form dust. Such physical degradation is undesirable because the pieces or dust thus formed are often of insufficient mass to successfully oppose the furnace updrafts discussed above.

Binder substances used in the known carbon raiser products typically contain all or a major portion of substances other than carbon, requiring the addition of a greater amount of the product to raise the carbon content of the metal and the introduction of contaminants into the metal. For example, sodium silicate binder includes no carbon, while carbohydrate-based binders, although including carbon in their chemical structure, include no elemental carbon and also contain significant amounts of non-carbon elements. Carbon raiser bodies formed using these known binders will greatly reduce the efficiency of the carbon pickup. In the case of mineral-based binders such as sodium silicate most of the binder will dissolve upon contact with the metal and will then enter into the slag layer. Some sodium silicate may, however, re-infiltrate the molten metal. In the case of carbohydrate-based binders, most of the binding agent will volatilize out before reaching the surface of the molten metal.

In addition to the other disadvantages associated with non-carbonaceous binders used in known carbon raiser products, several of the carbon raiser products using such binders have been shown to add a low percentage of their total available carbon content (as low as 50%) to the finished metal.

In addition, the production of carbon raisers with either mineral or carbohydrate-based binders requires a significant addition of water when the binder is combined with the carbonaceous material. This moisture must then be removed from the completed briquets, requiring additional equipment, one or more additional steps in the production process, and additional expense.

Some known binders, such as dextrin or other carbohydrate-based derivatives, are hygroscopic. Preformed carbon raiser bodies incorporating such hygroscopic binders may physically degrade upon exposure to moisture and must be protected during shipment and storage from rain and other high moisture environments. Even if the moisture used in production of the carbon raiser bodies is removed, the moisture content of preformed carbon raiser bodies having hygroscopic binders can build over time just by exposure to damp air. If these bodies are not used promptly or, if stored for a time, thoroughly dried before their addition to a furnace, a steam explosion can result.

Thus, it is apparent from the aforementioned disadvantages of commercially available carbon raiser products that a need exists for carbon raiser bodies having improved structural integrity, a higher available carbon content, a low level of impurities, a non-hygroscopic nature, and a size and mass which ensures placement of a high portion of total available carbon into the molten metal.

SUMMARY OF THE INVENTION

The present invention provides an improved method for producing formed bodies from carbonaceous starting materials and is particularly suited for the production of formed carbonaceous bodies to be used as preformed carbon raisers to increase the carbon content of metals. The method of this invention addresses the deficiencies of the conventional, commercially available preformed carbon raiser products and provides a carbon raiser product which overcomes the problems heretofore encountered.

In general, the method of the instant invention produces carbon raiser bodies from synthetic graphite and coal tar pitch. Synthetic graphite is approximately 99% elemental carbon, while coal tar pitch is approximately 50% carbon, this latter percentage varying somewhat with the grade of coal tar pitch used. Because the available carbon content of coal tar pitch is higher than that of conventional carbon raiser binding substances, carbon raiser bodies formed by the method of the present invention have a higher percentage of available carbon than many commercially available multi-component carbon raiser products. Carbon raiser bodies formed using the instant method may have in excess of 98% available carbon.

Carbon raiser bodies made using the present method also act to place into molten metal a portion of their total available carbon in excess of that of known carbon raiser products. Carbon raiser bodies produced by the instant method typically place between 80% and 90% of their total available carbon into the molten metal.

Only minimal amounts of coal tar pitch binder is required in the method of the present invention to form a carbon raiser body with acceptable structural integrity. The less binder used necessarily limits the presence of non-carbon contaminants which may adversely affect the properties of the finished metal.

Further, the carbon raiser bodies of the present invention have sufficient physical integrity to resist the cracking, crumbling, and dust formation characteristic of commercially available carbon raiser products. In addition, because coal tar pitch is hydrophobic, and is therefore non-hygroscopic and unaffected by moisture, the instant method addresses the deficient performance of known carbon raiser products when exposed to rain or other high moisture environments.

The present invention's method generally includes the step of combining particles of synthetic graphite with particles of coal tar pitch to form a mixture, and compressing all or a portion of the mixture under pressure sufficient to soften the coal tar pitch and maintaining such pressure for a period of time sufficient to produce a discrete formed body. Although the major components of the mixture formed by the present method are synthetic graphite and coal tar pitch, it is contemplated that for particular applications additives suitable for enhancing the properties of the resultant metal may be combined with the mixture.

The synthetic graphite particles to be used in the instant method are commercially available and preferably should be of high purity. More particularly, the synthetic graphite particles used in the instant method are preferably both dry and at least as fine as 20 mesh, i.e., the particles should be able to fit through a screen or sieve with at least 20 apertures per square inch.

The coal tar pitch particles to be used in the method of the present invention should preferably be both fine and dry, and more particularly, should be processed at least as fine as 200 mesh.

The scope of the instant invention comprehends combining the synthetic graphite particles and coal tar pitch particles in a variety of relative proportions. The invention's scope more particularly comprehends combining a major portion of synthetic graphite particles and a minor portion of coal tar pitch particles, and most particularly, combining synthetic graphite and coal tar pitch particles in such proportions that the resulting combination includes about 4% to about 10% by weight coal tar pitch particles. The particles may be combined at any temperature below that of the softening point of the coal tar pitch binder, but preferably at room temperature.

It is contemplated that the particles of synthetic graphite and coal tar pitch may be combined using any available means, but, more particularly, using a means which allows the particles to intimately combine such that the coal tar pitch particles may thoroughly coat the synthetic graphite particles. As such, the scope of the step of combining the particles may further include the step of processing the particles in a paddle mixer or mulling machine, which are devices for uniformly mixing solids by a combined rubbing and smearing action analogous to that of a mortar and pestle. Alternatively, a ribbon blender can be used to mix the solids.

The method of the instant invention further comprises the step of compressing the mixture resulting from combining the synthetic qraphite and coal tar pitch particles. It is contemplated that the scope of this step encompasses employing any means for applying pressure to the synthetic graphite/coal tar pitch mixture sufficient to cause the temperature of the compressed mixture to rise at least to the softening point of the coal tar pitch. Upon softening, the coal tar pitch particles bind together the particles of synthetic graphite. Pressure is to be applied to the mixture for a period of time sufficient to form a unitary body from the mixture. The step of compressing the mixture may include, for example, introducing at least a portion of the synthetic graphite/coal tar pitch mixture into either a briquetting machine, pelletizing machine or an extruder wherein pressure is applied to the mixture sufficient to melt the coal tar pitch and for the time necessary to form individual bodies of carbon raiser product.

The scope of the instant method includes the formation of carbon raiser bodies of any size. Experimentation has shown, however, that individual carbon raiser bodies with a diameter no less than about ⅛ inch are better able to resist the updraft of hot gases created in furnaces and successfully reach the molten metal. As such, the instant method more particularly contemplates producing synthetic graphite/coal tar pitch carbon raiser bodies with a diameter no less than about ⅛ inch.

The present invention is also drawn to a body comprising synthetic graphite and a lesser amount of coal tar pitch, and, more particularly, to a body which includes about 90 to about 96 parts by weight synthetic graphite, the remainder of the body being coal tar pitch. The body may be of any size, but preferably is on the average no less than ⅛ inch in diameter.

DETAILED DESCRIPTION OF THE PREFERRED EMBODIMENT

A first step in the method of the present invention is to combine particles of synthetic graphite and particles of coal tar pitch.

Graphite is a crystalline allotropic form of carbon which in its natural form contains approximately 25% minerals and 4% volatiles. The purer form of graphite, synthetic graphite, may be prepared by heating naturally occurring graphite to approximately 4000° F. for an extended period to allow the contaminating volatiles to gas off and the minerals to melt out. After heating, the product consists of a core of very pure graphite, containing less than 1% minerals and 1% volatiles, coated with the leached out materials. Because of its high carbon content and low content of non-carbon contaminants, it is advantageous to use synthetic graphite as a carbon raiser in molten metals. Synthetic graphite is commercially available.

The synthetic graphite particles to be used in the instant method should preferably be both fine and dry. It is anticipated that carbon raiser bodies can be produced by the instant method using graphite as coarse as about 20 mesh to as fine or finer than 325 mesh.

Coal tar pitch is a non-hygroscopic, dark brown to black amorphous residue which remains after coal tar is redistilled. The preferred grade of coal tar pitch used in the method of the present invention is approximately 45–55% available carbon, i.e., carbon which could be incorporated into the molten metal. Because of its high available carbon content, coal tar pitch provides an advantage over presently used binder substances, which may contain little or no available carbon. Because coal tar pitch is non-hygroscopic (e.g., hydrophobic), carbon raiser bodies produced with coal tar pitch do not pick up moisture, thus overcoming a disadvantage of presently employed carbohydrate-based binder substances.

Figure 1:
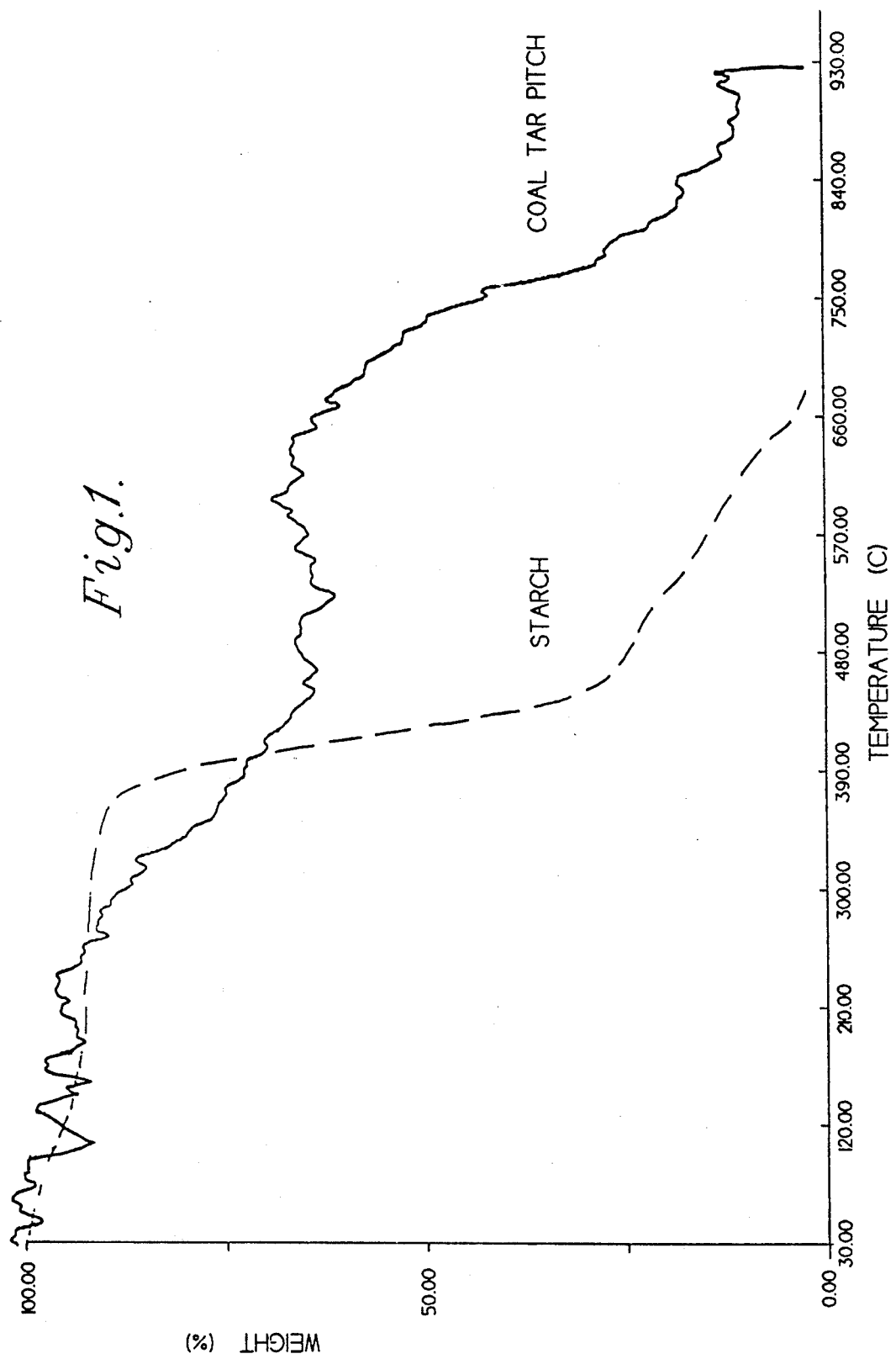
FIG. 1 is a graph comparing the proportion of a sample of binder substance remaining versus temperature for both (i) coal tar pitch binder and (ii) starch binder.
Figure 2:
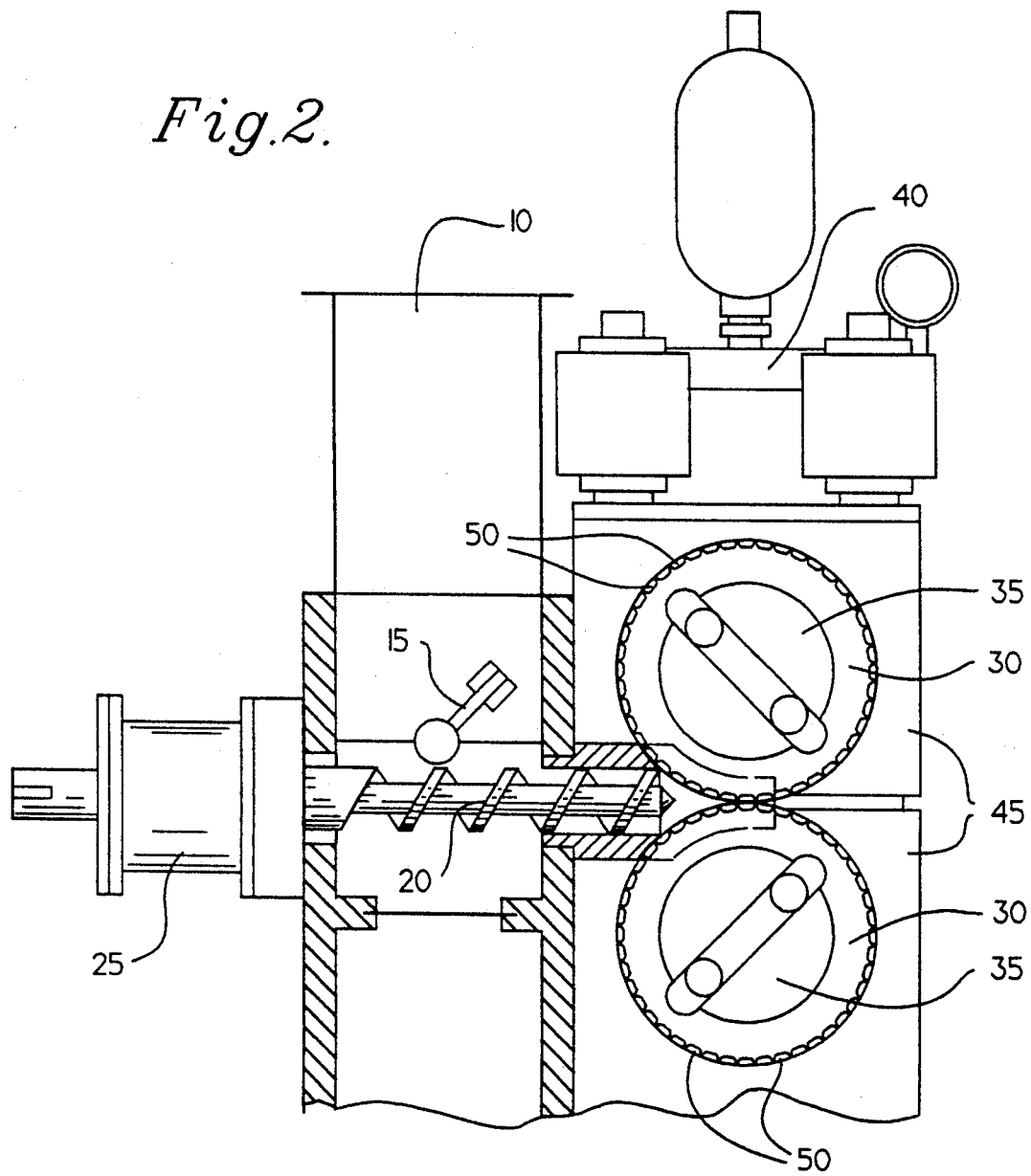
FIG. 2 is a partial, front elevational view, depicting some elements in cross-section, of a briquetting machine which may be used in the method of the instant invention.

Also, coal tar pitch binder burns out at a temperature higher than that of carbohydrate-based binders. FIG. 1 shows the proportion of samples of both coal tar pitch binder and starch binder which remain with increasing temperature. Starch binder burns out at a greater rate and at a lower temperature than coal tar pitch. The sample of starch binder was completely burned out at approximately 690° C., while a portion of the coal tar pitch sample remained at temperatures in excess of 900° C. Because of the ability of coal tar pitch to withstand high temperatures, carbon raiser bodies formed with coal tar pitch do not physically degrade before reaching the molten metal in a furnace as do bodies formed with conventional carbohydrate-based binders. The tendency to loose binder at relatively low temperatures is undesirable because the fragments of carbon raiser produced may have insufficient weight to oppose the furnace's updraft.

The method of producing coal tar pitch is well known, and several refiners are capable of producing it. Depending upon the distillation technique, different grades of crude tar are produced which in turn have differing volatiles contents. The higher the volatiles content of the pitch, the lower the softening temperature and, thus, when compressed with the graphite, the more homogeneous the mix. A more homogeneous mix produces a sturdier product. Experimentation has shown that coal tar pitches having softening points greater than 140° C. will not form useful briquets if added in concentrations less than about 7% by weight. It is believed, however, that coal tar pitches with softening points greater than 140° C. will form strong briquets if used in concentrations greater than 7%, but at the expense of a higher level of impurities in the produced briquets. In applications which are not particularly sensitive to the level of impurities in the finished metal, briquets made with such high softening point coal tar pitches will be useful.

Thus, the differences in softening temperature from grade to grade will affect the amount of coal tar pitch required to produce a sturdy product. The choice of pitch grade and amount necessarily must be a compromise between the physical properties of the formed bodies and the chemistry of the final product.

Particles of synthetic graphite and coal tar pitch having the above-mentioned characteristics are then combined using any method which intimately combines the particles such that the coal tar pitch particles generally coat the synthetic graphite particles. The particles may be combined at room temperature. Sufficient coating of the synthetic graphite particles is necessary so that when the synthetic graphite/coal tar pitch mixture is compressed under pressure sufficient to soften the coal tar pitch particles, these particles bind together the synthetic graphite particles and form a unitary body from the mixture.

One particular method of intimately combining the synthetic graphite and coal tar pitch particles is by using a mulling machine, also known as a muller or paddle mixer. A mulling machine uniformly mixes solids by a combined rubbing and smearing action analogous to the action of a mortar and pestle. The mulling machine consists of a stationary circular pan within which two heavy wheel-like members, together with plows, revolve. The wheel-like members have flat, wide surfaces which ride on the materials and effect the mixing action. As the inner edges of the wheels travel a lesser distance than the outer edges, a smearing action is provided across the surface of the wheels. The plows continually rake the material into the path of the wheels as the unit revolves.

In order to maximize the amount of available carbon and minimize the amount of non-carbon contaminants in the produced carbon raiser bodies, a major portion of synthetic graphite particles is combined with a minor portion of coal tar pitch particles. More particularly, experimentation has shown that unitary carbon raiser bodies with satisfactory structural integrity may be formed by the present method by combining synthetic graphite and low softening point coal tar pitch in proportions such that the resulting mixture preferably contains coal tar pitch particles in the range of about 4% to about 9% by weight, and more preferably in the range of about 6% to about 7%, and even more preferably in the range of 5.5% to about 6.5% by weight. That such a minimal weight percentage of coal tar pitch, a carbonaceous compound, can be used to produce completed carbon raiser bodies with acceptable structural integrity provides advantages over known multi-component carbon raiser bodies which use binder substances in greater proportions and which have greater amounts of non-carbon contaminants. Not only does the minimal binder content decrease the presence of non-carbon contaminants, but the high available carbon content of coal tar pitch also reduces the potential contaminant content.

After the synthetic graphite/coal tar pitch mixture is prepared, all or portions of the mixture are compressed using any means that creates sufficient pressure such that the temperature of the compressed mixture rises to at least the softening point of the coal tar pitch. Pressure is applied to the mixture for a period of time sufficient to form a unitary body from the mixture. A number of such compressing means are known in the art and include briquetting, extruding, and compacting. Briquetting machines are available from, for example, K. R. Komarek Briquetting Research Company and from BEPEX Corporation, Rolling Meadows, Ill.

FIG. 1 schematically illustrates the Model B-220A Briquetter, manufactured by K. R. Komarek Briquetting Research Company, which may be used in the compressing step of the instant method. The mixture of synthetic graphite particles and coal tar pitch particles is placed into the feed hopper 10. Material from the feed hopper, agitated by paddle mixer 15, is supplied onto feed screw 20 connected to screw feeder bearing 25. The feed screw 20, in turn, meters the mixture between two opposing rolls 30. The circumference of the opposing face of each roll 30 includes at least one continuous row of pockets 50, each pocket in the size and shape of one-half of the desired unitary body. The portion of the mixture metered between the rolls 30 by the feed screw 20 enters the pockets 50 and is compressed between the two rolls 30, which are cantilevered on the ends of roll shafts 35 outside bearing blocks 45. An adjustable hydraulic system 40 provides the force holding the rolls together and thereby compressing the material between the rolls. The force supplied by the rolls 30 is equal in magnitude to the roll separating force generated by the compressed material in the pockets 50 of the rolls 30. A gas-filled accumulator in the hydraulic system acts as a pressure reservoir, and accumulator pre-charge pressure determines the stiffness of the hydraulic system.

The pressure supplied by the rolls 30 to the metered mixture is adjusted such that the coal tar pitch portion of the mixture melts when compressed and, when cooled, acts to bind the particles of synthetic graphite together. The speed of the feed screw 20 is adjusted such that the desired amount of the mixture is fed to the rolls 30, while the speed of the rolls 30 is set such that the portion of the mixture introduced into the pockets 50 is compressed for a time period sufficient to create a unitary body. Although each roll 30 may have more than one continuous row of pockets around the circumference of the rolls, experimentation has shown that rolls with a single row of pockets provide the most favorable results.

It is believed that the present method may be used to form unitary bodies of any desired size and shape. However, because the carbon raiser bodies must have sufficient weight to overcome the updraft created in furnaces containing molten metal, the body formed using this method should generally be, on the average, no less than ¼ inch in diameter. The preferred diameter is no greater than two inches in diameter. It will be appreciated by those skilled in the art that the use of the term "diameter" herein does not mean that the formed bodies must be circular or spherical in shape. Any shape having about the same relative dimensions will work very well.

Tests were run to determine both the composition and durability of the briquets produced by the method of the present invention. Unless noted otherwise, the carbon raiser bodies used in the following tests were produced (1) at room temperature, (2) at atmospheric pressure, and (3) under the parameters of the instant method. The synthetic graphite and coal tar pitch particles were combined as described above and then compressed on a K.R. Komarek Model B-220A Briquetter briquetting machine.

A first series of tests measured the volatiles, combustibles, ash, sulfur, and non-carbon contaminants content of both the synthetic graphite/coal tar pitch preblend mixture and of the finished briquets. The data associated with this first series of tests is provided in Tables 1 through 38. To determine the percent composition of volatiles, a sample briquet from each run was placed on a ceramic boat and heated for one minute in a tube furnace at 1800° F. in an inert nitrogen atmosphere. This heating caused the volatile portion of the briquet to gas off, leaving the carbon portion. The briquet was then removed, cooled, and weighed to determine its volatile content. A high volatile content is undesirable because when the carbon raiser body is introduced into molten metal the volatile portion of the body burns off and does not add to the carbon content of the molten metal.

To measure the ash content, the remaining carbon portion of the briquet was then combusted in the tube furnace in an oxygen atmosphere to burn off the combustible portion and leave the ash portion. When a carbon raiser body is placed into molten metal the ash formed may melt and enter into the slag floating on the molten metal. If the slag is vigorously stirred, the ash may enter the molten metal. Because ash does not increase the molten metal's carbon content and may contaminate the finished metal, a low ash content is desirable.

The combustible portion of the carbon raiser body is carbon which may increase the carbon content of the molten metal. As such, a high combustibles content is desirable.

The moisture content of the body was also measured. Although moisture does not damage the chemistry of the carbon raiser product, the moisture content should be minimized because of the possibility of a steam explosion when moist briquets are immersed in molten metal. An advantage of the instant method is that it produces carbon raiser bodies with a non-hygroscopic binder which does not attract moisture. Carbon raiser bodies formed with known hygroscopic binder substances, for example, dextrin and other carbohydrate-based binders, attract moisture and may over time build up dangerous moisture levels.

At each tested coal tar pitch concentration, this first testing procedure was carried out on several sample briquets in order to determine the chemical uniformity of the final briquets and to ensure that proper mixing of the briquet ingredients had occurred. The content of non-carbon contaminants, including sulfur, hydrogen, and nitrogen was also measured. These components negatively affect the properties of finished metals. It is important, therefore, to minimize their content in any additive product. Nitrogen is particularly objectionable in finished steel and cast iron. Its concentration should, if possible, be limited to no more than about 0.1%.

The initial runs of the first series of test, shown in Tables 1 through 28, and the second runs, shown in Tables 29 through 38, demonstrate the high carbon content and low non-carbon contaminant content of carbon raiser bodies produced by the method of this invention. The weight percentage of coal tar pitch particles was varied. The weight percentages reported in the initial runs, shown in Tables 1 through 28, are approximations. All tests at a certain coal tar pitch percentage were completed, however, on briquets produced from the same batch of synthetic graphite/coal tar pitch.

The coal tar pitch used in the briquets tested in Tables 1 through 28 had a softening point of 110°–115° C. In the following tables, NM indicates that the particular property was not measured.

TABLE 1

Content of Formed Bodies Produced with Approximately 3.8% Coal Tar Pitch

| Run # | Nitrogen (%) | Volatiles (%) | Combustibles (%) | Ash (%) | Sulfur (%) |
|---|---|---|---|---|---|
| 1 | 0.0690 | 1.86 | 98.03 | 0.11 | 0.064 |

TABLE 2

Content of Formed Bodies Produced with Approximately 4.3% Coal Tar Pitch

| Run # | Nitrogen (%) | Volatiles (%) | Combustibles (%) | Ash (%) | Sulfur (%) |
|---|---|---|---|---|---|
| 1 | 0.0739 | 1.67 | 98.21 | 0.12 | NM |

TABLE 3

Content of Formed Bodies Produced with Approximately 4.8% Coal Tar Pitch

| Run # | Moisture (%) | Volatiles (%) | Combustibles (%) | Ash (%) | Sulfur (%) |
|---|---|---|---|---|---|
| 1 | 0.035 | 2.34 | 97.43 | 0.23 | 0.061 |
| 2 | 0.041 | 2.33 | 97.36 | 0.29 | 0.062 |
| 3 | 0.041 | 2.61 | 97.22 | 0.17 | 0.061 |
| 4 | 0.035 | 2.52 | 97.08 | 0.40 | 0.062 |
| 5 | 0.034 | 2.43 | 97.37 | 0.21 | 0.062 |
| 6 | 0.041 | 2.55 | 97.05 | 0.40 | 0.061 |
| 7 | 0.029 | 2.22 | 97.62 | 0.17 | 0.062 |
| 8 | 0.030 | 2.49 | 97.08 | 0.43 | 0.063 |
| 9 | 0.046 | 2.36 | 97.24 | 0.40 | 0.061 |
| 10 | 0.052 | 2.45 | 97.22 | 0.33 | 0.060 |

As the Tables 1 through 3 demonstrate, as the percent composition of coal tar pitch is increased, the overall volatiles and ash content generally increases and the overall combustibles content decreases slightly. Tables 4 and 5 show the hydrogen and nitrogen content of a sampling of briquets having approximately 4.8% coal tar pitch.

TABLE 4

Hydrogen Content of Formed Bodies with Approximately 4.8% Coal Tar Pitch

| | Hydrogen (%) | |
|---|---|---|
| Run # | (Trial 1) | (Trial 2) |
| 1 | 0.2865 | 0.2234 |
| 2 | 0.2066 | 0.2653 |

TABLE 5

Nitrogen Content of Formed Bodies with Approximately 4.8% Coal Tar Pitch

| | Nitrogen (%) | | |
|---|---|---|---|
| Run # | (Trial 1) | (Trial 2) | (Trial 3) |
| 1 | 0.0863 | 0.0835 | 0.0842 |
| 2 | 0.0824 | 0.0856 | 0.0861 |
| 3 | 0.0854 | 0.0939 | NM |
| 4 | 0.0906 | 0.0935 | 0.0881 |
| 5 | 0.0930 | 0.0918 | NM |
| 6 | 0.0868 | 0.0876 | NM |
| 7 | 0.0794 | 0.0829 | 0.0790 |
| 8 | 0.0855 | 0.0926 | 0.0877 |
| 9 | 0.0874 | 0.0906 | 0.0934 |
| 10 | 0.0876 | 0.0937 | 0.0883 |

Tables 6–8 provide results of the first and second series of tests run on briquets having a coal tar pitch content of approximately 5.2%.

TABLE 6

Content of Formed Bodies Produced with Approximately 5.2% Coal Tar Pitch

| Run # | Moisture (%) | Volatiles (%) | Combustibles (%) | Ash (%) | Sulfur (%) |
|---|---|---|---|---|---|
| 1 | 0.027 | 2.69 | 96.89 | 0.42 | 0.071 |
| 2 | 0.020 | 2.63 | 96.88 | 0.49 | 0.070 |
| 3 | 0.019 | 2.68 | 97.01 | 0.31 | 0.070 |
| 4 | 0.037 | 2.48 | 97.13 | 0.39 | 0.069 |
| 5 | 0.021 | 2.29 | 97.32 | 0.39 | 0.069 |
| 6 | 0.020 | 2.14 | 97.40 | 0.46 | 0.071 |
| 7 | 0.017 | 2.12 | 97.65 | 0.23 | 0.070 |
| 8 | 0.026 | 2.38 | 97.33 | 0.29 | 0.069 |
| 9 | 0.023 | 2.40 | 97.02 | 0.58 | 0.071 |
| 10 | 0.018 | 2.42 | 97.02 | 0.57 | 0.070 |

TABLE 7

Hydrogen Content of Formed Bodies with Approximately 5.2% Coal Tar Pitch

| | Hydrogen (%) | |
|---|---|---|
| Run # | (Trial 1) | (Trial 2) |
| 1 | 0.2282 | 0.2304 |
| 2 | 0.2403 | 0.2380 |

TABLE 8

Nitrogen Content of Formed Bodies with Approximately 5.2% Coal Tar Pitch

| | Nitrogen (%) | |
|---|---|---|
| Run # | (Trial 1) | (Trial 2) |
| 1 | 0.102 | 0.104 |
| 2 | 0.107 | 0.102 |
| 3 | 0.105 | 0.102 |
| 4 | 0.102 | 0.111 |
| 5 | 0.105 | 0.101 |

TABLE 8-continued

Nitrogen Content of Formed Bodies
with Approximately 5.2% Coal Tar Pitch

| Run # | Nitrogen (%) (Trial 1) | (Trial 2) |
|---|---|---|
| 6 | 0.106 | 0.109 |
| 7 | 0.109 | 0.106 |
| 8 | 0.106 | 0.106 |
| 9 | 0.107 | 0.105 |
| 10 | 0.106 | 0.104 |

Tables 9-11 show the results of the first and second series of tests run on briquets having a coal tar pitch content of approximately 5.7%.

TABLE 9

Content of Formed Bodies Produced with Approximately 5.7% Coal Tar Pitch

| Run # | Moisture (%) | Volatiles (%) | Combustibles (%) | Ash (%) | Sulfur (%) |
|---|---|---|---|---|---|
| 1 | 0.052 | 2.54 | 97.17 | 0.29 | 0.073 |
| 2 | 0.057 | 2.47 | 97.29 | 0.24 | 0.074 |
| 3 | 0.066 | 2.67 | 97.02 | 0.31 | 0.072 |
| 4 | 0.067 | 2.77 | 96.93 | 0.30 | 0.074 |
| 5 | 0.030 | 2.70 | 96.92 | 0.38 | NM |
| 6 | 0.035 | 2.57 | 96.94 | 0.49 | NM |
| 7 | 0.032 | 2.57 | 97.18 | 0.25 | NM |
| 8 | 0.032 | 2.84 | 96.88 | 0.28 | 0.074 |
| 9 | 0.035 | 2.54 | 97.03 | 0.43 | 0.073 |
| 10 | 0.040 | 2.50 | 97.16 | 0.34 | 0.071 |

TABLE 10

Hydrogen Content of Formed Bodies with Approximately 5.7% Coal Tar Pitch

| Run # | Hydrogen (%) (Trial 1) | (Trial 2) |
|---|---|---|
| 1 | 0.2408 | 0.2454 |
| 2 | 0.2413 | 0.2415 |

TABLE 11

Nitrogen Content of Formed Bodies with Approximately 5.7% Coal Tar Pitch

| Run # | Nitrogen (%) (Trial 1) | (Trial 2) | (Trial 3) |
|---|---|---|---|
| 1 | 0.102 | 0.107 | NM |
| 2 | 0.106 | 0.104 | NM |
| 3 | 0.105 | 0.107 | NM |
| 4 | 0.102 | 0.099 | 0.103 |
| 5 | 0.108 | 0.109 | NM |
| 6 | 0.114 | 0.114 | NM |
| 7 | 0.110 | 0.107 | NM |
| 8 | 0.113 | 0.106 | 0.106 |
| 9 | 0.105 | 0.106 | NM |
| 10 | 0.104 | 0.102 | NM |

Tables 12-14 show the results of the first and second series of tests run on briquets having a coal tar pitch content of approximately 6.5%.

TABLE 12

Content of Formed Bodies Produced with Approximately 6.5% Coal Tar Pitch

| Run # | Moisture (%) | Volatiles (%) | Combustibles (%) | Ash (%) | Sulfur (%) |
|---|---|---|---|---|---|
| 1 | 0.039 | 2.45 | 96.76 | 0.79 | 0.095 |
| 2 | 0.035 | 2.47 | 96.70 | 0.83 | 0.095 |
| 3 | 0.031 | 2.60 | 96.71 | 0.69 | 0.095 |
| 4 | 0.031 | 2.42 | 96.83 | 0.75 | 0.096 |
| 5 | 0.027 | 2.87 | 96.53 | 0.59 | 0.095 |
| 6 | 0.029 | 2.75 | 96.57 | 0.68 | 0.096 |
| 7 | 0.020 | 3.06 | 96.47 | 0.47 | 0.093 |

TABLE 12-continued

Content of Formed Bodies Produced with Approximately 6.5% Coal Tar Pitch

| Run # | Moisture (%) | Volatiles (%) | Combustibles (%) | Ash (%) | Sulfur (%) |
|---|---|---|---|---|---|
| 8 | 0.025 | 2.49 | 96.77 | 0.74 | 0.100 |
| 9 | 0.044 | 2.55 | 97.06 | 0.39 | 0.097 |
| 10 | 0.048 | 2.87 | 96.54 | 0.60 | 0.095 |

TABLE 13

Hydrogen Content of Formed Bodies with Approximately 6.5% Coal Tar Pitch

| Run # | Hydrogen (%) (Trial 1) | (Trial 2) |
|---|---|---|
| 1 | 0.2604 | 0.2648 |
| 2 | 0.2663 | 0.2692 |

TABLE 14

Nitrogen Content of Formed Bodies with Approximately 6.5% Coal Tar Pitch

| Run # | Nitrogen (%) (Trial 1) | (Trial 2) |
|---|---|---|
| 1 | 0.125 | 0.124 |
| 2 | 0.129 | 0.127 |
| 3 | 0.124 | 0.125 |
| 4 | 0.129 | 0.130 |
| 5 | 0.126 | 0.123 |
| 6 | 0.122 | 0.124 |
| 7 | 0.126 | 0.123 |
| 8 | 0.125 | 0.126 |
| 9 | 0.123 | 0.122 |
| 10 | 0.125 | 0.122 |

Tables 15-17 show the results of the first and second series of tests fun on briquets having a coal tar pitch content of approximately 7.8%.

TABLE 15

Content of Formed Bodies Produced with Approximately 7.0% Coal Tar Pitch

| Run # | Moisture (%) | Volatiles (%) | Combustibles (%) | Ash (%) | Sulfur (%) |
|---|---|---|---|---|---|
| 1 | 0.026 | 3.24 | 95.99 | 0.77 | 0.067 |
| 2 | 0.024 | 3.10 | 96.21 | 0.69 | 0.064 |
| 3 | 0.040 | 3.03 | 96.13 | 0.83 | 0.069 |
| 4 | 0.032 | 3.11 | 96.23 | 0.65 | 0.068 |
| 5 | 0.031 | 3.05 | 96.15 | 0.79 | 0.064 |
| 6 | 0.031 | 3.35 | 96.13 | 0.53 | 0.067 |
| 7 | 0.024 | 2.80 | 96.24 | 0.96 | 0.067 |
| 8 | 0.029 | 2.99 | 96.13 | 0.88 | 0.067 |
| 9 | 0.025 | 2.84 | 96.28 | 0.88 | 0.068 |
| 10 | 0.016 | 3.19 | 96.03 | 0.77 | 0.069 |
| 11 | 0.014 | 3.30 | 95.84 | 0.87 | 0.068 |
| 12 | 0.030 | 2.86 | 96.62 | 0.53 | 0.069 |
| 13 | 0.031 | 2.77 | 96.49 | 0.74 | 0.067 |
| 14 | 0.026 | 2.77 | 96.39 | 0.87 | 0.067 |
| 15 | 0.028 | 2.74 | 96.41 | 0.85 | 0.066 |

TABLE 16

Hydrogen Content of Formed Bodies with Approximately 7.0% Coal Tar Pitch

| Run # | Hydrogen (%) (Trial 1) | (Trial 2) |
|---|---|---|
| 1 | 0.35 | 0.33 |
| 2 | 0.31 | 0.40 |

TABLE 17

Nitrogen Content of Formed Bodies
with Approximately 7.0% Coal Tar Pitch

| Run # | Nitrogen (%) | |
|---|---|---|
| | (Trial 1) | (Trial 2) |
| 1 | 0.109 | 0.109 |
| 2 | 0.111 | 0.111 |
| 3 | 0.109 | 0.111 |
| 4 | 0.110 | 0.110 |
| 5 | 0.111 | 0.115 |
| 6 | 0.112 | 0.115 |
| 7 | 0.116 | 0.115 |
| 8 | 0.115 | 0.115 |
| 9 | 0.115 | 0.118 |
| 10 | 0.115 | 0.112 |

Tables 18–20 show the results of the first and second series of tests run on briquets having a coal tar pitch content of approximately 7.4%.

TABLE 18

Content of Formed Bodies Produced
with Approximately 7.4% Coal Tar Pitch

| Run # | Moisture (%) | Volatiles (%) | Combustibles (%) | Ash (%) | Sulfur (%) |
|---|---|---|---|---|---|
| 1 | 0.029 | 2.81 | 97.13 | 0.06 | 0.0684 |
| 2 | 0.027 | 2.91 | 96.79 | 0.30 | 0.0690 |
| 3 | 0.025 | 2.83 | 96.69 | 0.48 | 0.069 |
| 4 | 0.030 | 2.87 | 96.88 | 0.25 | 0.065 |
| 5 | 0.034 | 2.98 | 96.65 | 0.37 | 0.058 |
| 6 | 0.029 | 2.57 | 96.55 | 0.87 | 0.059 |
| 7 | 0.028 | 2.74 | 96.54 | 0.72 | 0.066 |
| 8 | 0.033 | 2.09 | 96.66 | 0.25 | 0.068 |
| 9 | 0.038 | 2.91 | 96.68 | 0.40 | 0.068 |
| 10 | 0.038 | 2.60 | 97.00 | 0.40 | 0.067 |
| 11 | 0.037 | 3.01 | 96.57 | 0.42 | 0.067 |
| 12 | 0.038 | 3.08 | 96.68 | 0.24 | 0.067 |
| 13 | 0.025 | 2.88 | 96.87 | 0.25 | 0.067 |
| 14 | 0.023 | 2.60 | 97.11 | 0.29 | 0.066 |
| 15 | 0.025 | 2.85 | 96.73 | 0.41 | 0.069 |

TABLE 19

Hydrogen Content of Formed Bodies
with Approximately 7.4% Coal Tar Pitch

| Run # | Hydrogen (%) | |
|---|---|---|
| | (Trial 1) | (Trial 2) |
| 1 | 0.34 | 0.33 |
| 2 | 0.34 | 0.33 |

TABLE 20

Nitrogen Content of Formed Bodies
with Approximately 7.4% Coal Tar Pitch

| Run # | Nitrogen (%) | |
|---|---|---|
| | (Trial 1) | (Trial 2) |
| 1 | 0.117 | 0.116 |
| 2 | 0.117 | 0.120 |
| 3 | 0.117 | 0.119 |
| 4 | 0.114 | 0.117 |
| 5 | 0.117 | 0.116 |
| 6 | 0.116 | 0.116 |
| 7 | 0.114 | 0.117 |
| 8 | 0.120 | 0.119 |
| 9 | 0.120 | 0.119 |
| 10 | 0.117 | 0.118 |

Tables 21–23 show the results of the first and second series of tests run on briquets having a coal tar pitch content of approximately 7.8%.

TABLE 21

Content of Formed Bodies Produced
with Approximately 7.8% Coal Tar Pitch

| Run # | Moisture (%) | Volatiles (%) | Combustibles (%) | Ash (%) | Sulfur (%) |
|---|---|---|---|---|---|
| 1 | 0.016 | 3.12 | 96.59 | 0.30 | 0.074 |
| 2 | 0.021 | 3.03 | 96.64 | 0.33 | 0.070 |
| 3 | 0.016 | 2.92 | 96.60 | 0.47 | 0.070 |
| 4 | 0.018 | 2.64 | 96.81 | 0.55 | 0.071 |
| 5 | 0.024 | 3.17 | 96.52 | 0.31 | 0.070 |
| 6 | 0.021 | 3.03 | 96.61 | 0.36 | 0.073 |
| 7 | 0.020 | 2.79 | 97.15 | 0.06 | 0.071 |
| 8 | 0.026 | 2.61 | 97.05 | 0.34 | 0.071 |
| 9 | 0.027 | 3.10 | 96.72 | 0.18 | 0.069 |
| 10 | 0.024 | 2.69 | 97.11 | 0.20 | 0.068 |
| 11 | 0.025 | 2.98 | 96.78 | 0.24 | 0.072 |
| 12 | 0.028 | 2.88 | 96.86 | 0.26 | 0.068 |
| 13 | 0.025 | 2.89 | 96.82 | 0.29 | 0.069 |
| 14 | 0.023 | 3.22 | 96.50 | 0.28 | 0.068 |
| 15 | 0.031 | 2.84 | 96.65 | 0.51 | 0.069 |

TABLE 22

Hydrogen Content of Formed Bodies
with Approximately 7.8% Coal Tar Pitch

| Run # | Hydrogen (%) | |
|---|---|---|
| | (Trial 1) | (Trial 2) |
| 1 | 0.39 | 0.36 |
| 2 | 0.43 | 0.39 |

TABLE 23

Nitrogen Content of Formed Bodies
with Approximately 7.8% Coal Tar Pitch

| Run # | Nitrogen (%) | |
|---|---|---|
| | (Trial 1) | (Trial 2) |
| 1 | 0.123 | 0.121 |
| 2 | 0.125 | 0.123 |
| 3 | 0.125 | 0.124 |
| 4 | 0.122 | 0.123 |
| 5 | 0.120 | 0.123 |
| 6 | 0.123 | 0.122 |
| 7 | 0.123 | 0.121 |
| 8 | 0.123 | 0.124 |
| 9 | 0.120 | 0.125 |
| 10 | 0.121 | 0.124 |

Tables 24–26 show the results of the first and second series of tests run on briquets having a coal tar pitch content of approximately 8.3%.

TABLE 24

Content of Formed Bodies Produced
with Approximately 8.3% Coal Tar Pitch

| Run # | Moisture (%) | Volatiles (%) | Combustibles (%) | Ash (%) | Sulfur (%) |
|---|---|---|---|---|---|
| 1 | 0.03 | 2.63 | 96.94 | 0.44 | 0.0719 |
| 2 | 0.02 | 2.53 | 97.04 | 0.43 | 0.0759 |
| 3 | 0.033 | 2.42 | 97.03 | 0.55 | 0.0740 |
| 4 | 0.055 | 2.67 | 96.82 | 0.51 | 0.0739 |
| 5 | 0.041 | 2.88 | 96.69 | 0.44 | 0.0741 |
| 6 | 0.044 | 2.52 | 97.04 | 0.43 | 0.0740 |
| 7 | 0.017 | 2.78 | 96.67 | 0.55 | 0.0751 |
| 8 | 0.023 | 2.46 | 97.25 | 0.29 | 0.0732 |
| 9 | 0.022 | 2.76 | 96.80 | 0.45 | 0.0744 |
| 10 | 0.027 | 2.71 | 96.86 | 0.43 | 0.0771 |
| 11 | 0.037 | 2.50 | 97.17 | 0.33 | 0.0739 |
| 12 | 0.055 | 2.74 | 96.92 | 0.34 | 0.0736 |
| 13 | 0.051 | 2.59 | 96.90 | 0.52 | 0.0723 |
| 14 | 0.035 | 2.41 | 97.06 | 0.53 | 0.0761 |
| 15 | 0.029 | 2.73 | 96.73 | 0.54 | 0.746 |

TABLE 25

Nitrogen Content of Formed Bodies
with Approximately 8.3% Coal Tar Pitch

| Run # | Nitrogen (%) | |
|---|---|---|
| | (Trial 1) | (Trial 2) |
| 1 | 0.38 | 0.38 |
| 2 | 0.38 | 0.37 |

TABLE 26

Nitrogen Content of Formed Bodies
with Approximately 8.3% Coal Tar Pitch

| Run # | Nitrogen (%) | |
|---|---|---|
| | (Trial 1) | (Trial 2) |
| 1 | 0.126 | 0.127 |
| 2 | 0.128 | 0.127 |
| 3 | 0.127 | 0.129 |
| 4 | 0.127 | 0.127 |
| 5 | 0.124 | 0.128 |
| 6 | 0.129 | 0.130 |
| 7 | 0.128 | 0.130 |
| 8 | 0.131 | 0.127 |
| 9 | 0.138 | 0.136 |
| 10 | 0.134 | 0.136 |

Tables 27-28 show the results of the first and second series of tests run on briquets having a coal tar pitch content of approximately 9.1%.

TABLE 27

Content of Formed Bodies Produced
with Approximately 9.1% Coal Tar Pitch

| Run # | Moisture (%) | Volatiles (%) | Combustibles (%) | Ash (%) | Sulfur (%) |
|---|---|---|---|---|---|
| 1 | 0.003 | 3.63 | 95.90 | 0.47 | 0.085 |
| 2 | 0.006 | 3.55 | 95.92 | 0.53 | 0.088 |
| 3 | 0.005 | 3.60 | 95.83 | 0.58 | 0.088 |
| 4 | <0.001 | 3.50 | 96.02 | 0.47 | 0.088 |
| 5 | <0.001 | 3.68 | 95.69 | 0.63 | 0.089 |
| 6 | <0.001 | 3.34 | 96.26 | 0.40 | 0.090 |
| 7 | 0.008 | 3.56 | 96.02 | 0.42 | 0.087 |
| 8 | 0.010 | 3.42 | 96.31 | 0.27 | 0.089 |
| 9 | 0.007 | 4.03 | 95.61 | 0.36 | 0.088 |
| 10 | 0.007 | 3.50 | 96.03 | 0.46 | 0.088 |
| 11 | 0.001 | 3.98 | 95.65 | 0.38 | 0.088 |
| 12 | 0.007 | 3.50 | 96.14 | 0.36 | 0.091 |
| 13 | <0.001 | 3.55 | 95.98 | 0.46 | 0.083 |
| 14 | 0.007 | 3.59 | 95.86 | 0.56 | 0.087 |
| 15 | 0.008 | 3.60 | 95.84 | 0.56 | 0.092 |

TABLE 28

Nitrogen Content of Formed Bodies
with Approximately 9.1% Coal Tar Pitch

| Run # | Nitrogen (%) | |
|---|---|---|
| | (Trial 1) | (Trial 2) |
| 1 | 0.145 | 0.150 |
| 2 | 0.148 | 0.152 |

The data of Tables 1 through 28 shows that carbon raiser bodies produced by the instant method have a volatiles and ash content lower than commercially available multi-component carbon raiser bodies, which have both a volatiles and ash content of about 3%. Also, bodies produced by the present method have a low content of sulfur, hydrogen, and nitrogen.

The test data of Tables 1 through 28 also shows that each briquet having the same coal tar pitch concentration had a relatively consistent concentration of the components tested for. This result indicates that briquets of consistent character may be produced by the instant method and, more specifically, indicates that the desired intimate mixing of the synthetic graphite and coal tar pitch particles is accomplished by the instant method.

The following Tables 29 through 38 report additional runs in the first series of tests on carbon raiser bodies produced using the method of the present invention. Table 29 provides the type and exact concentration of coal tar pitch used in each preblend batch to produce the tested briquets. In Table 29:A=coal tar pitch having a softening point of 110°-115° C.; B=coal tar pitch having a softening point of greater than 140° C. Tables 30 through 32 report the chemical composition of the preblend of synthetic graphite and coal tar pitch for each coal tar pitch type and concentration indicated in Table 29. Tables 33 through 35 set out the parameters of the K.R. Komarek B-220A Briquetter briquetting machine used to produce the completed briquets. Tables 36 through 38 show the chemical composition of the completed briquets.

TABLE 29

Coal Tar Pitch Type and
Concentration in Runs 1-13

| Batch No. | Coal Tar Pitch Type | Coal Tar Pitch Percentage |
|---|---|---|
| 1 | B | 3.85% |
| 2 | B | 4.31% |
| 3 | B | 4.76% |
| 4 | B | 5.21% |
| 5 | B | 5.66% |
| 6 | B | 6.10% |
| 7 | B | 6.54% |
| 8 | B | 7.00% |
| 9 | A | 6.54% |
| 10 | A | 5.66% |
| 11 | A | 4.76% |
| 12 | A | 3.85% |
| 13 | A | 6.54% |

Table 30 shows the chemical composition of the preblend batches 1 through 4 produced by combining synthetic graphite and coal tar pitch in the proportions indicated in Table 29.

TABLE 30

Composition of Preblend Batches 1 Through 4

| | Batch 1 | Batch 2 | Batch 3 | Batch 4 |
|---|---|---|---|---|
| Average Sulfur (%) | 0.0479 | 0.0502 | 0.0493 | 0.0547 |
| Average Volatiles (%) | 1.49 | 1.81 | 1.75 | 1.69 |
| Average Combustibles (%) | 98.47 | 98.12 | 98.18 | 98.19 |
| Average Ash (%) | 0.05 | 0.08 | 0.07 | 0.12 |
| Average Moisture (%) | 0.011 | 0.0091 | 0.0078 | 0.0429 |

Table 31 shows the chemical composition of the preblend batches 5 through 8 produced by combining synthetic graphite and coal tar pitch in the proportions indicated in Table 29.

TABLE 31

Composition of Preblend Batches 5 Through 8

| | Batch 5 | Batch 6 | Batch 7 | Batch 8 |
|---|---|---|---|---|
| Average Sulfur | 0.0555 | 0.0657 | 0.0592 | 0.0591 |

TABLE 31-continued

| Composition of Preblend Batches 5 Through 8 | | | | |
|---|---|---|---|---|
| | Batch 5 | Batch 6 | Batch 7 | Batch 8 |
| (%) | | | | |
| Average Volatiles (%) | 1.99 | 1.92 | 1.95 | 2.30 |
| Average Combustibles (%) | 97.97 | 97.97 | 97.94 | 97.51 |
| Average Ash (%) | 0.05 | 0.11 | 0.11 | 0.17 |
| Average Moisture (%) | 0.0081 | 0.0250 | 0.0149 | 0.0090 |

Table 32 shows the chemical composition of the preblend batches 9 through 13 produced by combining synthetic graphite and coal tar pitch in the proportions indicated in Table 29.

TABLE 32

| Composition of Preblend Batches 5 Through 8 | | | | | |
|---|---|---|---|---|---|
| | Batch 9 | Batch 10 | Batch 11 | Batch 12 | Batch 13 |
| Average Sulfur (%) | 0.0639 | 0.0624 | 0.0525 | 0.0494 | 0.0639 |
| Average Volatiles (%) | 2.31 | 1.99 | 1.82 | 1.63 | 2.31 |
| Average Combustibles (%) | 97.58 | 97.89 | 98.01 | 98.23 | 97.58 |
| Average Ash (%) | 0.10 | 0.12 | 0.17 | 0.14 | 0.10 |
| Average Moisture (%) | 0.0467 | 0.0437 | 0.0365 | 0.0304 | 0.0467 |

Table 33 sets out the parameters of the briquetting machine used to produce the briquets from preblend batches 1 through 4. In each production run in Table 33 the roll diameter was 305 mm.

TABLE 33

| Briquetter Parameters for Batches 1 Through 4 | | | | |
|---|---|---|---|---|
| | Batch 1 | Batch 2 | Batch 3 | Batch 4 |
| No. of pockets | 75 | 60 | 60 | 60 |
| No. of Rows | 2 | 1 | 1 | 1 |
| Roll Face Width (mm) | 51 | 32 | 32 | 32 |
| Roll Speed (rev/min) | 6.8 | 7.2 | 7.4 | 7.2 |
| Roll Drive Power (Kw) | 2.30 | 2.50 | 1.80 | 1.80 |
| Feed Screw Outside Diameter (mm) | 45 | 35 | 35 | 35 |
| Feed Screw Root Diameter (mm) | 30 | 19 | 19 | 19 |
| Feed Screw Pitch (mm) | 41 | 38 | 38 | 38 |
| Screw Barrel Inside Diameter (mm) | 51 | 48 | 48 | 48 |
| Feed Screw Speed (rev/min) | 170 | 145 | 150 | 145 |
| Feed Screw Drive Power (Kw) | 1.5 | 2.1 | 1.7 | 1.7 |
| Hydraulic System Pressure (MPa) | 7.50 | 11.00 | 10.00 | 10.00 |
| Initial Accumulator Pressure (Mpa) | 6.25 | 6.25 | 6.25 | 6.25 |
| Real Roll Separating Force (MN) | 0.115 | 0.165 | 0.150 | 0.150 |
| Initial Roll Gap (mm) | 0.6 | 0.5 | 0.5 | 0.5 |
| Web Thickness (mm) | 1.6 | 1.9 | 1.5 | 1.5 |
| Briquet Calc. Pressure (Mpa) | 176.50 | 322.88 | 293.52 | 293.52 |
| Throughput (t/h) | NM | 90 | 62 | 66 |
| Briquet Weight (g) | NM | 4.25 | 3.70 | 3.92 |

The following Tables 34 and 35 provide the briquetting machine parameters for the production of briquets from preblend batches 5 through 13. The following parameters were identical for all of the runs in Tables 34 and 35:305 mm roll diameter; 60 pockets arranged in 1 row; 32 mm wide roll face; feed screw outside diameter of 35 mm; feed screw root diameter of 19 mm; screw barrel inside diameter of 48 mm; 10.00 MPa pressure in the hydraulic system; initial accumulator pressure of 6.25 mPa; real roll separating force of 0.150 MN; and a briquet calc. pressure of 293.52 MPa.

TABLE 34

| Briquetter Parameters for Batches 5 Through 8 | | | | |
|---|---|---|---|---|
| | Batch 5 | Batch 6 | Batch 7 | Batch 8 |
| Roll Drive Power (Kw) | 1.90 | 1.90 | 1.80 | 1.70 |
| Feed Screw Speed (rev/min) | 145 | 150 | 145 | 142 |
| Feed Screw Drive Power (Kw) | 1.8 | 1.8 | 1.6 | 1.7 |
| Web Thickness (mm) | 1.7 | 1.7 | 1.6 | 1.7 |
| Throughput (t/h) | 0.109 | 0.109 | 0.113 | 0.107 |
| Briquet Weight (g) | 3.82 | 3.73 | 3.68 | 3.74 |

TABLE 35

| Briquetter Parameters for Batches 9 Through 13 | | | | | |
|---|---|---|---|---|---|
| | Batch 9 | Batch 10 | Batch 11 | Batch 12 | Batch 13 |
| Roll Drive Power (Kw) | 1.70 | 1.70 | 1.60 | 1.60 | 3.10 |
| Feed Screw Speed (rev/min) | 142 | 142 | 142 | 140 | 175 |
| Feed Screw Drive Power (Kw) | 1.6 | 1.6 | 1.5 | 1.4 | 3.2 |
| Web Thickness (mm) | 1.6 | 1.6 | 1.5 | 1.6 | 1.3 |
| Throughput (t/h) | 0.107 | 0.111 | 0.111 | 0.109 | 0.118 |
| Briquet Weight (g) | 3.67 | 3.60 | 3.65 | 3.65 | NM |

Tables 36 through 38 provide data on the composition of completed carbon raiser briquets produced by the instant method from preblend batches 1 through 13 in Table 29 above using a K.R. Komareck B-220A Briquetter briquetting machine operating under the parameters provided in Tables 33 through 35. Table 36 provides data on completed briquets using preblend batches 1 through 4 using a briquetting machine under the parameters of Table 33.

TABLE 36

Composition of Completed Briquets Produced from Batches 1 through 4

|  | Batch 1 | Batch 2 | Batch 3 | Batch 4 |
|---|---|---|---|---|
| Average Sulfur (%) | 0.04618 | 0.04731 | 0.04933 | 0.04933 |
| Average Nitrogen (%) | 0.0788 | 0.0805 | 0.0835 | 0.0898 |
| Average Hydrogen (%) | 0.1514 | 0.1628 | 0.1722 | 0.1885 |
| Average Volatiles (%) | 1.43 | 1.55 | 1.67 | 1.80 |
| Average Combustibles (%) | 98.28 | 98.33 | 98.23 | 98.04 |
| Average Ash (%) | 0.29 | 0.10 | 0.09 | 0.16 |
| Average Moisture (%) | 0.0015 | 0.0004 | 0.0062 | 0.0011 |

Table 37 provides data on the composition of briquets produced from batches 5 through 8 using a briquetting machine under the parameters of Table 34.

TABLE 37

Composition of Briquets Produced from Batches 5 through 8

|  | Batch 5 | Batch 6 | Batch 7 | Batch 8 |
|---|---|---|---|---|
| Average Sulfur (%) | 0.04712 | 0.05059 | 0.05362 | 0.05555 |
| Average Nitrogen (%) | 0.0908 | 0.0981 | 0.0986 | 0.1025 |
| Average Hydrogen (%) | 0.2064 | 0.2086 | 0.2331 | 0.2416 |
| Average Volatiles (%) | 1.78 | 1.92 | 2.06 | 1.92 |
| Average Combustibles (%) | 98.10 | 97.92 | 97.85 | 97.77 |
| Average Ash (%) | 0.13 | 0.15 | 0.08 | 0.31 |
| Average Moisture (%) | 0.0001 | 0.0028 | 0.0035 | 0.0001 |

Table 38 provides data on the composition of briquets produced from batches 9 through 13 using a briquetting machine under the parameters in Table 35.

TABLE 38

Composition of Briquets Produced from Batches 1 through 4

|  | Batch 9 | Batch 10 | Batch 11 | Batch 12 | Batch 13 |
|---|---|---|---|---|---|
| Average Sulfur (%) | 0.0662 | 0.05697 | 0.05267 | 0.0459 | 0.06436 |
| Average Nitrogen (%) | 0.0980 | 0.0851 | 0.0761 | 0.0657 | 0.0990 |
| Average Hydrogen (%) | 0.2194 | 0.1979 | 0.1756 | 0.1449 | 0.2002 |
| Average Volatiles (%) | 2.79 | 2.02 | 1.71 | 1.44 | 2.57 |
| Average Combustibles (%) | 97.12 | 97.93 | 98.25 | 98.47 | 97.32 |
| Average Ash (%) | 0.09 | 0.05 | 0.05 | 0.09 | 0.11 |
| Average Moisture (%) | NM | 0.0121 | 0.0108 | 0.0017 | 0.0080 |

As in Tables 1 through 28, the data in Tables 29 through 38 shows that as the concentration of coal tar pitch binder decreases, the percentage of the contaminants sulfur, nitrogen, and hydrogen generally decreases. The data also shows that carbon raiser bodies produced by the instant method have a high percentage of available carbon and a low content of non-carbon contaminants. Carbon raiser bodies with the tested coal tar pitch percentages had a combustibles, i.e., available carbon, content greater than 97.1% and as high as 98.47%. In all cases, the completed briquets had a low moisture content and a nitrogen content, in all but one case, less than 0.1%

In addition to testing completed carbon raiser bodies for their composition, bodies produced by the present method were also evaluated for structural integrity. In the testing procedure, the weight percentage of coal tar pitch was varied. In producing the carbon raiser bodies for this testing procedure, a K.R. Komarek Model B-220A Briquetter briquetting machine was used. In Tables 39 through 41 the particular ingredients used in manufacturing the bodies, and the parameters of the briquetting machine are noted for each run. In each run in Tables 39 through 41 the coal tar pitch used had a softening point of 110°–115° C. Table 42 sets out the results of testing procedures used to evaluate the structural integrity of completed briquets.

In runs 1 through 4, shown in Table 39 below, the briquetting machine employed a feed screw having an outside diameter of 35 mm, a screw root diameter of 19 mm and a screw barrel inside diameter of 38 mm. The briquetting machine used a single row of 66 pockets on a roll having a diameter of 305 mm and a face width of 38 mm. The hydraulic system pressure was between about 9.50 and 9.75 MPa and the initial accumulator pressure was 6.75 MPa, creating a real roll separating force of about 0.150 MN. The initial roll gap was set at 0.6 mm and the web thickness was in the range of 1.5 to 1.9 mm. The starting materials used in each run were mixed for 10 minutes, and in each case the resulting mixture had a moisture content below 0.5%.

TABLE 39

Carbon Raiser Body Production Data

| Starting Materials* | Run #1<br>A | Run #2<br>B | Run #3<br>B | Run #4<br>C |
|---|---|---|---|---|
| Coal Tar Pitch (%) | 6.5 | 9.1 | 9.1 | 6.5 |
| Roll Speed (rev/min) | 4.0 | 4.0 | 7.6 | 4.6 |
| Roll Drive Power (Kw) | 0.80 | 1.00 | 1.80 | 1.10 |
| Feed Screw Speed (rev/min) | 125 | 135 | 400 | 135 |
| Feed Screw Drive | 1.3 | 2.2 | 6.1 | 2.0 |

TABLE 39-continued

| Carbon Raiser Body Production Data | | | | |
|---|---|---|---|---|
| Starting Materials* | Run #1 A | Run #2 B | Run #3 B | Run #4 C |
| Power (Kw) | | | | |
| Briquet Calc. Pressure (Mpa) | 181.26 | 180.05 | 180.05 | 180.05 |
| Throughput (t/h) | 0.103 | 0.108 | 0.208 | 0.127 |
| Briquet Weight (g) | 9.10 | 9.53 | 9.41 | 9.52 |

*Composition A consisted of 100 parts synthetic graphite (80 mesh) and 7 parts coal tar pitch.
Composition B consisted of 100 parts synthetic graphite (80 mesh) and 10 parts coal tar pitch.
Composition C consisted of 50 parts 200 mesh synthetic graphite, 50 parts 80 mesh synthetic graphite, and 7 parts coal tar pitch.

In Runs 5 through 8, shown in Table 40 below, the briquetting machine used rolls with a diameter of 305 mm.

TABLE 40

| Carbon Raiser Body Production Data | | | | |
|---|---|---|---|---|
| Starting Materials* | Run #5 D | Run #6 E | Run #7 E | Run #8 E |
| Coal Tar Pitch (%) | 0 | 6.5 | 6.5 | 6.5 |
| Mixing Time (min.) | 0 | 10 | 10 | 10 |
| Batch Moisture Content (%) | <0.5 | <0.1 | <0.1 | <0.1 |
| No. of Pockets | 44 | 48 | 60 | 60 |
| No. of Rows | 1 | 2 | 2 | 1 |
| Roll Face Width (mm) | 38 | 76 | 76 | 32 |
| Roll Speed (rev/min) | 4.6 | 7.6 | 6.8 | 7.0 |
| Roll Drive Power (Kw) | 1.20 | 3.50 | 2.20 | 2.10 |
| Feed Screw Outside Diameter (mm) | 35 | 71 | 63.5 | 35 |
| Feed Screw Root Diameter (mm) | 19 | 38 | 35 | 19 |
| Feed Screw Pitch (mm) | 38 | 51 | 51 | 38 |
| Screw Barrel Inside Diameter (mm) | 38 | 76 | 76 | 48 |
| Feed Screw Speed (rev/min) | 135 | 90 | 100 | 170 |
| Feed Screw Drive Power (Kw) | 2.2 | 1.8 | 1.9 | 2.5 |
| Hydraulic System Pressure (Mpa) | 9.50 | 15.00 | 15.00 | 9.50 |
| Initial Accumulator Pressure (Mpa) | 6.75 | 6.25 | 6.25 | 6.25 |
| Real Roll Separating Force (MN) | 0.149 | 0.229 | 0.225 | 0.145 |
| Initial Roll Gap (mm) | 0.6 | 0.5 | 0.5 | 0.5 |
| Web Thickness (mm) | 1.5 | 1.8 | 2.2 | 2.0 |
| Briquet Calc. Pressure (Mpa) | 180.05 | 148.31 | 148.31 | 283.74 |
| Throughput (t/h) | 0.119 | NM | 0.281 | 0.118 |
| Briquet Weight (g) | 8.89 | 6.06 | 6.17 | 4.02 |

*Composition D consisted of 100 parts fines material screened from runs 1, 2, 3, and 4.
Composition E consisted of 100 parts synthetic graphite (80 mesh) and 7 parts coal tar pitch.

Runs 9 through 12, shown in Table 41, utilized a briquetting machine with rolls having a diameter of 305 mm. The rolls included one row of 60 pockets and had a face width of 32 mm. The feed screw outside diameter of the briquetting machine was 35 mm, feed screw pitch was 38 mm, feed screw root diameter was 1.9 mm and feed screw barrel inside diameter was 48 mm. The initial accumulator pressure was set at 6.25 Mpa and the initial roll gap was 0.5 mm.

TABLE 41

| Carbon Raiser Body Production Data | | | | |
|---|---|---|---|---|
| Starting Material* | Run #9 F | Run #10 G | Run #11 H | Run #12 I |
| Coal Tar Pitch (%) | 5.7 | 4.8 | 4.3 | 5.2 |
| Batch Moisture Content (%) | <0.1 | <0.1 | <0.1 | <0.1 |
| Roll Speed (rev/min) | 6.8 | 7.0 | 5.2 | 6.7 |
| Roll Drive Power (Kw) | 2.10 | 2.10 | 2.5–4.0 | 2.10 |
| Feed Screw Speed (rev/min) | 155 | 150 | 260 | 135 |
| Feed Screw Drive Power (Kw) | 2.4 | 2.2 | 2.9–4.0 | 2.2 |
| Hydraulic System Pressure (Mpa) | 9.50 | 9.50 | 13.75 | 9.50 |
| Real Roll Separating Force (MN) | 0.145 | 0.145 | 0.220 | 0.145 |
| Initial Roll Gap (mm) | 0.5 | 0.5 | 0.5 | 0.5 |
| Web Thickness (mm) | 2.1 | 2.2 | NM | 2.2 |
| Briquet Calc. Pressure (Mpa) | 283.74 | 283.74 | 430.50 | 283.74 |
| Throughput (t/h) | 0.114 | 0.119 | NM | 0.118 |
| Briquet Weight (g) | 4.10 | 4.15 | NM | 4.12 |

*Composition F consisted of 100 parts synthetic graphite (80 mesh) and 6 parts coal tar pitch.
Composition G consisted of 100 parts synthetic graphite (80 mesh) and 5 parts coal tar pitch.
Composition H consisted of 100 parts coke fines and 4.5 parts coal tar pitch.
Composition I consisted of 100 parts synthetic graphite (80 mesh) and 5.5 parts coal tar pitch.

The structural integrity of the briquets produced in runs 1 through 12 set forth above are shown in Table 42. Briquets from each run were tested for mean crushing force, i.e., the minimum force required to crush the briquet. Mean crushing force was evaluated for both a newly-formed, or "green" briquet, and for a briquet which had been allowed to cure for a period of two hours at ambient temperatures. In addition, the height from which a "green" briquet dropped broke apart was also evaluated for each run.

TABLE 42

Evaluation of Structural Integrity of Carbon Raiser Bodies from the Production Runs Listed In Table 29 Through 31

| | Run #1 | Run #2 | Run #3 | Run #4 | Run #5 | Run #6 | Run #7 | Run #8 | Run #9 | Run #10 | Run #11 | Run #12 |
|---|---|---|---|---|---|---|---|---|---|---|---|---|
| Body Weight (g) | NM | 9.43 | NM | NM | NM | 6.06 | 6.17 | 4.02 | 4.00 | 4.15 | NM | 4.12 |
| Mean Crushing Force (N) ("green" body) | 142 | 485 | 396 | 309 | 115 | 21.3 | 23.2 | 166.4 | 128.9 | 80.0 | NM | 104.1 |
| Drop Height at Failure (m) ("green" body) | 0.8 | 1.4 | 1.0 | 1.0 | 0.6 | 0.15 | 0.25 | 1.2 | 0.9 | 0.4 | NM | 0.6 |
| Mean Crushing Force (N) After 2 Hours in Ambient Temperature | 169 | 395 | NM | 299 | NM | NM | NM | 148.9 | 129.3 | 76.6 | NM | 98.2 |

The test data of Table 42 shows that formed carbon raiser bodies with acceptable structural integrity may be produced by the method of the present invention. Acceptable results were achieved in runs 1 through 4, 8 through 10, and 12. These runs correspond to additions of coal tar pitch of 4.8%, 5.2%, 6.5% and 9.1%. The failure of the other runs to produce carbon raiser bodies with acceptable structural integrity may be explained. Run 5 utilized as a starting material the fines screened from the bodies formed in runs 1 through 4 and did not use a binder substance. As such, the deficient structural integrity of those bodies is not attributable to the instant method, but instead, indicates that the coal tar pitch binder allows the creation of bodies with desirable properties.

Runs 6 and 7, although using as starting materials 80 mesh synthetic graphite and 6.5% coal tar pitch, produced bodies with insufficient structural integrity because the rolls in the briquetting machine used two rows of pockets instead of the one row of pockets used in all other runs. It is hypothesized that using rolls with two rows of pockets resulted in a decrease in pressure under which the briquets were compressed. Briquets with reduced structural integrity apparently resulted from the decreased pressure. As such, for improved structural integrity, it is preferable that any briquetting machine used in the instant method utilize a single row of pockets on its rolls or, if two rows of pockets are employed, that the pressure be increased to compensate for the increased area over which pressure is to be applied.

Run 11 used coke fines instead of synthetic graphite as the carbonaceous starting material and 4.3% coal tar pitch as binder. The mixture was found to be impossible to briquet on the briquetting machine. The inability to successfully briquet the coke fines/coal tar pitch mixture shows that the synthetic graphite/coal tar pitch mixture formed in the present method has unique properties. The synthetic graphite/coal tar pitch mixture produces a carbon raiser body with enhanced structural integrity.

The results in Table 42 also indicate that as the coal tar binder percentage is increased, the formed bodies are better able to withstand stress forces. It must be remembered, however, that increasing the binder percentage also increases the percentage of non-carbon compounds in the carbon raiser bodies. Thus, it is not advantageous to increase binder content any more than is necessary to provide sufficient structural integrity. Any increase in structural integrity resulting from adding coal tar pitch would also increase the content of noncarbon contaminants. With this in mind, carbon raiser bodies formed with as little as about 4.0% coal tar pitch with a softening point of 114° C. had acceptable structural integrity with a minimal amount of non-carbon contaminants. Any increased structural integrity achieved in the runs using increased amounts of coal tar pitch came at the expense of a maximum amount of available carbon. The optimum amount of binder will depend on the application intended for the briquet, e.g., the level of purity desired for the finished metal and the conditions under which the briquets will be handled.

An additional test was carried out on formed carbon raiser bodies to determine their structural integrity. In this test a "Rotap" machine was used. A Rotap machine consists of a nest of screens and an arm which beats the top screen. Carbon raiser bodies produced by the instant method with varying percentage amounts of coal tar pitch binder, were placed between the screens. The beating arm caused the bodies to be jostled and eroded, thereby simulating severe rough handling. Any material which broke off from the bodies fell through the bottom screen and was measured as a percentage of the total weight of the complete body. The bodies for this testing procedure were produced using coal tar pitch with a softening point of 110°-115° C.

TABLE 43

Rotap Results for Carbon Raiser Bodies Having Varying Coal Tar Pitch Contents

| Coal Tar Pitch (%) | Run Parameters | Amount of Body Removed In 1st Five Mins. | Amount of Body Removed in Second Five Mins. |
|---|---|---|---|
| 4.8 | 6 briquets on ¼ inch screen | 29.00% | 42.79% |
|  | 6 briquets on 20 mesh screen | 20.70% | 34.20% |
| 5.2 | 6 briquets on ¼ inch screen | 26.14% | 42.06% |
|  | 6 briquets on 20 mesh screen | 28.48% | 39.90% |
| 5.7 | 6 briquets on ¼ inch screen | 28.64% | 45.28% |
|  | 6 briquets on 20 mesh screen | 18.34% | 30.84% |
| 6.5 | 6 briquets on ¼ inch screen | 22.14% | 35.61% |
|  | 6 briquets on 20 mesh screen | 34.09% | 51.09% |
| 7.0 | 6 briquets on ¼ inch screen | 16.79% 25.06% | 26.79% 38.79% |
|  | 6 briquets on 20 mesh screen | 18.73% 27.89% | 31.18% 43.80% |
| 7.4 | 6 briquets on ¼ inch screen | 12.01% 16.35% | 19.94% 26.62% |
|  | 6 briquets on 20 mesh screen | 12.20% 13.13% | 19.66% 21.39% |
| 7.8 | 6 briquets on ¼ inch screen | 12.61% 9.42% | 22.70% 17.53% |
|  | 6 briquets on 20 mesh screen | 10.20% 10.30% | 17.95% 18.03% |
| 8.3 | 6 briquets on ¼ inch screen | 15.48% | 23.73% |
|  | 6 briquets on 20 mesh screen | 13.55% | 21.56% |

The results achieved in the Rotap experiments of Table 43 show that at any tested coal tar pitch percentage the structural integrity of the bodies was acceptable. As such, carbon raiser bodies with as little as about 4.8% coal tar pitch, produced by the instant method, were shown by this experiment to have acceptable structural strength.

An additional testing procedure was also carried out to evaluate structural integrity. The parameters and results for these testing runs are noted in Table 44. Carbon raiser bodies were produced by the instant method using variations of (1) the number of pockets on the rolls of the briquetting machine (and thereby resulting in different briquet size), (2) the type of coal tar pitch used, and (3) the weight percentage of coal tar pitch used to create the mixture. When using a double pocket roll, the produced bodies measured ⅜×7/16×5/16 inches. When using a single pocket roll, the bodies produced measured 1×⅜×7/16 inches.

The following abbreviations are used in the Table 44: A = coal tar pitch having a softening point of 114° C., a volatiles content of 49.85%, a combustibles content of 50.40%, and an ash content of 0.02%. B = coal tar pitch having a softening point of 152° C., a volatiles content of 38.19%, a combustibles content of 61.76%, and an ash content of 0.06%. The softening point of pitch differs from its melting point, which is 40° C. to 50° C. higher. The higher the volatiles content of the coal tar pitch, the thinner and stickier the pitch, and the lower the softening point.

TABLE 44

Briquetting Test Using Various Parameters

| Batch | No. of Pockets on Roll | Pitch Type | Total Amount of Mixture | Wt % Coal Tar Pitch | Avg. Crush Strength (N) | Comments |
|---|---|---|---|---|---|---|
| 1 | 1 | B | 107.50 | 6.98 | 35.50 | Split in half |
| 2 | 1 | B | 107.00 | 6.54 | 32.34 | Moderate strength |
| 3 | 1 | B | 106.50 | 6.10 | 31.32 | Moderate strength |
| 4 | 1 | B | 106.00 | 5.66 | 23.75 | Hand crushable; fines |
| 5 | 1 | B | 105.50 | 5.21 | 20.73 | Hand crushable; fines |
| 6 | 1 | B | 105.00 | 4.76 | 19.92 | Hand crushable; fines; split in half |
| 7 | 1 | B | 104.50 | 4.31 | 17.39 | Hand crushable; fines; spalling |
| 8 | 1 | B | 104.00 | 3.85 | — | No whole briquets; spalling; hand crushable; fines |
| 9 | 2 | A | 80.25 | 6.54 | — | Weak briquets; spalling |
| 10 | 1 | A | 80.25 | 6.54 | 128.29 | Hard and strong |
| 11 | 1 | A | 79.50 | 5.66 | 62.27 | Good strength |
| 12 | 1 | A | 78.75 | 4.76 | 41.37 | Satisfactory strength |
| 13 | 1 | A | 78.00 | 3.85 | 28.69 | Hand crushable |

The test data in Table 44 shows that coal tar pitch with a relatively lower softening temperature has better adhesive properties and produces briquets with structural integrity superior to briquets produced with an equal amount of coal tar pitch with a higher softening temperature. It is believed that a more homogeneous mix of synthetic graphite and coal tar pitch is obtained with pitches having a lower softening point, thus requiring less pitch. When using a pitch with a relatively high softening point, more pitch will be required to produce a briquet with satisfactory structural integrity. These tests also corroborate that briquets should preferably be produced using a roll with a single row of pockets.

The following specific examples were carried out to test the structural integrity of carbon raiser bodies produced by the instant method. In each example, the coal tar pitch used had a softening temperature of 110°-115° C. Example 6, used coke in place of synthetic graphite. The result of Example 6, i.e., failure to briquet, indicates the significance of the synthetic graphite/coal tar pitch mixture in producing unitary carbon raiser bodies. The examples also show that if a briquetting machine is used, it preferably should include a single row of pockets on its rolls.

EXAMPLE #1

Seven lbs. coal tar pitch was mixed with 100 lbs. synthetic graphite. The resulting mixture included 6.54% coal tar pitch. The mixture was briquetted using a briquetting machine with a double row of pockets and a pocket size creating a body ¼×⅝ inches. Using this a double row of pockets, the briquetter was able to raise the temperature of the compressed mixture to only 120° F. The resulting briquets were very weak, able to withstand only 22.24 N of crushing force.

EXAMPLE 2

Seven lbs. of coal tar pitch was mixed with 100 lbs. of synthetic graphite resulting in a mixture which was 6.54% coal tar pitch. As in Example #1, a double row of pockets was used as well as a pocket size which created a ¼×⅝ inch body. In this run, however, a slower roll speed and a smaller screw diameter were used on the briquetting machine. The briquetter could only raise the temperature of the mixture to 110° F., resulting in weak briquets having only a 22.24 N of crush strength.

The briquetting temperature of the mixtures of Examples #1 and #2 was below the softening point of the coal tar pitch in the mixture. It is believed that the double row of pockets reduced the pressure per area during compression and thus, the temperature achieved. It is further believed that the application of additional pressure or the application of additional heat, or both, to the mixture during compression would improve the product when using multiple rows of pockets on the briquetting machine.

EXAMPLE #3

Seven lbs. of coal tar pitch was added to 100 lbs. of synthetic graphite, resulting in a mixture which was 6.54% coal tar pitch. The mixture was then compressed on a briquetting machine using a single row of pockets with a pocket size creating briquets of 15/16×½ inch. The mixture reached a maximum temperature of 170° F. during compression in the briquetter. The resulting briquets had acceptable crush strength of 177.94 N.

EXAMPLE #4

Six lbs. of coal tar pitch was mixed with 100 lbs. of synthetic graphite, producing a mixture which was 5.66% coal tar pitch. The resulting mixture was briquetted using a single row of pockets which produced 15/16×½ inch. When the briquetting machine was operated at its maximum production rate of 500 lbs. of carbon raiser produced per hour, the resulting briquets had an acceptable crush strength of 88.97 N. When the briquetter was operated at half maximum output, i.e., 250 lbs. per hour, the crush strength of produced bodies increased to 133.45 N.

EXAMPLE #5

Five lbs. of coal tar pitch was mixed with 100 lbs. of synthetic graphite, resulting in a mixture which is 4.76% coal tar pitch. The resulting mixture was compressed using a briquetting machine with a single row of pockets and a pocket size which produced bodies of 15/16×⅜ inch. The compressed mixture reached a maximum temperature of 160° F. The produced briquets were of decreased structural integrity as compared to the run in Example 6 which employed a higher coal tar pitch content; in this run, while bonding occurred, more half briquettes and spalling resulted, and more of the briquets fragmented when dropped.

EXAMPLE #6

Four and one-half lbs. coal tar pitch was mixed with 100 lbs. coke, the resulting mixture containing 4.31% coal tar pitch. The mixture was then compressed using a briquetting machine with a single row of pockets and a pocket size which would create briquets measuring 15/16×⅜ inch. The coke/coal tar pitch mixture failed to bond when compressed. No briquets were formed.

As demonstrated by the data from the foregoing testing procedures, carbon raiser bodies produced by the instant method possess numerous advantages. Use of the method results in a carbon raiser body with a high available carbon content, a low level of non-carbon contaminants, superior carbon placement into the molten metal, and acceptable structural integrity. As such, carbon raiser bodies produced by the instant method overcome many of the disadvantages of commercially available carbon raiser products.

It is claimed:

1. A method for producing formed bodies from carbonaceous substances for use in raising the carbon content of molten metals, the method comprising:
   (a) combining particles of synthetic graphite and particles of coal tar pitch to form a mixture thereof, wherein the coal tar pitch particles have a softening point of less than 140° C. the synthetic graphite comprising a major amount of the mixture and the coal tar pitch comprising a minor amount of the mixture, the minor amount being about 4% to about 10% by weight of the mixture; and
   (b) compressing at least a portion of the mixture under pressure which is alone sufficient to raise the temperature of the mixture, in the absence of the application of added heat, to at least the softening point of the coal tar pitch for a period of time sufficient to produce a formed body.

2. The method of claim 1 wherein the particles of synthetic graphite are at least as fine as about 20 mesh.

3. The method of claim 1 wherein the particles of coal tar pitch are at least as fine as about 200 mesh.

4. The method of claim I wherein the formed body is on the average no less than about ⅛ inch in diameter.

5. The method of claim 1 wherein the step of combining the particles of synthetic graphite and the particles of coal tar pitch further comprises processing the particles in a mulling machine.

6. The method of claim 1 wherein the step of compressing the mixture further comprises adding predetermined amounts of the mixture to a briquetting machine wherein pressure is applied to the mixture.

7. The method of claim 6 wherein the briquetting machine includes a single pocket roll.

8. The method of claim 1 wherein the step of compressing the mixture further comprises adding predetermined amounts of the mixture to a pelletizing machine wherein pressure is applied to the mixture.

9. A method for creating carbonaceous bodies for raising the carbon content of molten metals, the method comprising mixing a greater amount of dry particulate synthetic graphite with a lesser amount of dry particulate coal tar pitch to form a mixture, wherein the coal tar pitch particles have a softening point of less than 140° C. the lesser amount being about 4% to about 10% by weight of the mixture, applying sufficient pressure to at least a portion of the mixture to melt the coal tar pitch in the absence of the application of added heat, and maintaining the pressure for a period of time sufficient to produce a unitary body.

10. The method of claim 9 wherein the body formed has a volume no less than that of a sphere of about ⅛ inch in diameter.

11. The method of claim 9 wherein the particles of synthetic graphite are at least as fine as about 20 mesh and the particles of coal tar pitch are at least as fine as about 200 mesh.

12. The method of claim 11 wherein the body formed has a volume no less than that of a sphere of about ⅛ inch in diameter.

13. The method of claim 9 wherein the coal tar pitch has a softening point within the range of about 110° C. to 115° C.

14. The method of claim 9 wherein the coal tar pitch has a volatiles content of about 45-55%.

15. A formed carbonaceous body for use as an additive in molten metal wherein the body comprises a compressed mixture of a major portion by weight of dry particulate synthetic graphite and a minor portion by weight of dry particulate coal tar pitch, the minor portion being about 4% to about 10% by weight of the body.

16. The formed carbonaceous body of claim 15 wherein the body is on the average no less than about ⅛ inch in diameter and no greater than about two inches in diameter.

17. A method of raising the carbon content of molten metal, the method comprising: adding to molten metal a plurality of carbonaceous bodies formed from a compressed mixture of a major amount by weight of dry particulate synthetic graphite and a minor amount by weight of dry particulate coal tar pitch, said minor amount being about 4% to about 10% by weight of the bodies and said coal tar pitch having a softening point less than about 140° C., said formed carbonaceous bodies having an average diameter no less than about ⅛ inch and no greater than about two inches.

* * * * *

UNITED STATES PATENT AND TRADEMARK OFFICE
CERTIFICATE OF CORRECTION

PATENT NO. : 5,236,468
DATED : August 17, 1993
INVENTOR(S) : Michael H. Levine et al It is certified that error appears in the above-indentified patent and that said Letters Patent is hereby corrected as shown below:

Col. 1, line 7, delete "This" and substitute therefor --The--.

Col. 12, line 38, delete "fun" and substitute therefor --run--.

Col. 17, Table 32, line 23, delete "Batches 5 Through 8" and substitute therefor --Batches 9 through 13--.

Col. 19, Table 38, line 56, delete "Batches 1 through 4" and substitute therefor --Batches 9 through 13--.

Col. 20, Table 38 continued line 2 delete " 1 through 4" and substitute therefor --9 through 13--.

Col. 26, line 55, after "produced" insert --bodies--.

Signed and Sealed this

Twenty-third Day of August, 1994

BRUCE LEHMAN

Attest:

Attesting Officer

Commissioner of Patents and Trademarks